(12) United States Patent
McLeod et al.

(10) Patent No.: US 7,564,625 B2
(45) Date of Patent: Jul. 21, 2009

(54) SYSTEMS AND METHODS FOR A SCANNING BOOM MICROSCOPE

(75) Inventors: Charles S. McLeod, Enosburg Falls, VT (US); Robert A. Selzer, Waterbury, VT (US); Yunsheng Ma, South Burlington, VT (US)

(73) Assignee: JMAR Technologies, Inc., San Diego, CA (US)

( * ) Notice: Subject to any disclaimer, the term of this patent is extended or adjusted under 35 U.S.C. 154(b) by 77 days.

(21) Appl. No.: 11/336,390

(22) Filed: Jan. 20, 2006

(65) Prior Publication Data
US 2007/0236786 A1     Oct. 11, 2007

Related U.S. Application Data

(60) Provisional application No. 60/645,647, filed on Jan. 21, 2005.

(51) Int. Cl.
*G02B 21/26* (2006.01)

(52) U.S. Cl. ................................. 359/393; 359/392
(58) Field of Classification Search .............. 359/391
See application file for complete search history.

(56) References Cited

U.S. PATENT DOCUMENTS

2003/0057379 A1   3/2003   Montagu
2006/0000816 A1*  1/2006   Hogan ................ 219/121.75

OTHER PUBLICATIONS

PCT/US06/02135, International Search Report and Written Opinion of the International Searching Authority mailed Sep. 20, 2007.

* cited by examiner

*Primary Examiner*—Joshua L Pritchett
(74) *Attorney, Agent, or Firm*—Procoplo Cory Hargraves & Saritch LLP; Noel C. Gillespie

(57) ABSTRACT

A scanning boom microscope comprises an optical axis that can be varied into any axis or direction relative to a circular displacement about an optical boom that supports the scanning boom microscope's objective in free space. Accordingly, scanning boom microscope can be positioned to observe free standing samples away from the microscope base.

32 Claims, 3 Drawing Sheets

SYSTEMS AND METHODS FOR A SCANNING BOOM MICROSCOPE

CROSS-REFERENCE TO RELATED APPLICATIONS

This application claims priority to U.S. Provisional Application No. 60/645,647 filed on Jan. 21, 2005, entitled "Multi-Directional Scanning Boom Microscope," the entire contents of which is hereby incorporated by reference.

BACKGROUND

1. Field of the Invention

The embodiments described herein relate to microscope observing systems, and more particularly to methods for scanning large sample areas using a microscope observing system.

2. Background of the Invention

In a conventional microscope observing instrument, the sample or object to be observed is placed on a moving sample stage that can be manually adjusted or automatically manipulated, e.g., by a servo driven apparatus. Such conventional microscope instruments comprise an optical axis that is fixed in a single direction or position for viewing the sample. To change the position of the sample relative to the fixed optical axis, the sample stage holding the sample is set into motion, e.g., the sample stage is a moving sample stage, in such a manner as to place the sample in the correct observation position relative to the optical axis.

The moving sample stage is often permanently attached to the microscope instrument frame. Further, conventional microscope instruments often comprise an objective that remains stationary, or in a fixed optical axis, while the sample stage moves the sample relative to the fixed optical axis.

In certain instances, it is necessary to observe large sample areas. This can pose problems for conventional microscope observing instruments, because the sample must be moved in a coordinated fashion to allow efficient viewing of the entire sample. For example, it can be desirable to use scanning microscope technology to scan specimens or surfaces for computer aided or visual analysis. Further, such systems can be used for guiding and controlling through the use of imagery, e.g., a surgical laser, a mechanical cutting device, or other diagnostic device.

One of the challenges of observing a large sample area is the small available field size of the observing apparatus at high magnifications. No single optical element exists that allows viewing of all of the large areas at one time. There are several conventional devices in use that attempt to provide the scanning ability required. Certain of these devices are generally known as gantry microscope or as scanning probe microscope observing instruments. This type of instruments use a probe permanently fixed in a single observing axis or position and scan the probe over the sample under observation in a defined area.

These conventional devices have several drawbacks however. For example, a gantry microscope is supported by multiple assemblies and lacks the freedom or ability to observe samples in free space due to having one or two fixed observing axis. In general, conventional microscope observing instruments do not have the ability to freely translate or rotate into different observing orientations and are fixed in space with a defined, and thereby limited, sample area size, sample physical dimension, and locations of the sample.

A scanning probe microscope observing instrument uses a single point source of coherent radiation, or an Atomic Force Microscope (AFM) mechanical sensing tip that must physically contact the sample. Alternatively, such instruments can use capacitance properties or acoustical energy to build an image through software manipulation, but such instruments are not optical microscope observing instruments.

Conventional scanning probe microscope observing systems also do not provide a real-time full field of view, cannot be positioned to look at samples located away from the instrument base, cannot be oriented by design to any orientation 360 degrees about the optical observing axis, and are not freely supported in space.

A type of microscope observing system known as a scanning microscope does have the ability to scan a sample by taking individual frames and constructing them into a useable format that provides a full view of the sample. Scanning microscopes can, for example, be used to evaluate large areas of a sample to identify specific objects contained in large populations of other objects in a sample using image recognition software. But using conventional scanning microscopes for such applications can be very time consuming and can reduce the throughput of the sample process.

Conventional scanning microscopes are limited due to their form factor in the size of the sample they are able to process. Large asymmetrical objects can not be observed on a conventional scanning microscope due to size limitations. Continuous surfaces larger than 25 mm can not be observed in conventional scanning microscopes at useful magnification, such as those samples that might be encountered in a high magnification analysis of a metallurgical or material sample or surface.

SUMMARY

A scanning boom microscope does not comprise moving sample stage that is permanently attached to the scanning boom microscope. Rather the scanning boom microscope comprises an optical axis that can be varied into any axis or direction relative to a circular displacement about an optical boom that supports the scanning boom microscope's objective in free space. Accordingly, scanning boom microscope can be positioned to observe free standing samples away from the microscope base.

In one aspect, the optical boom is mounted to an x y z precision mechanical stage that allows movement under computer control and positioning of the optical boom relative to the sample under observation.

In another aspect, the x y z mechanical stage and optical boom microscope observing instrument is supported in free space. By virtue of having no sample stage which is moved relative to the objective, the restrictions and limitations placed on the previously described conventional microscope observing apparatus are removed.

These and other features, aspects, and embodiments of the invention are described below in the section entitled "Detailed Description."

BRIEF DESCRIPTION OF THE DRAWINGS

Features, aspects, and embodiments of the inventions are described in conjunction with the attached drawings, in which.

DETAILED DESCRIPTION OF THE PREFERRED EMBODIMENTS

The embodiments described below are directed to an optical microscope observing instrument comprising an optical boom that can be scanned over a sample regardless of its location or size, subject only to the length of the boom. The scanning boom optical format places the microscope instrument in free space with the flexibility of movement to accommodate samples that previous microscope observing apparatus could not scan due to the physical size or the orientation of the sample.

By using a scanning boom optic, a scanning boom microscope as described herein is free from the form factor constraints of conventional microscope instruments. This allows for much faster scanning speeds with access to observing positions above or below samples in any direction away from the microscope base. Either reflected or transmitted illumination is readily provided and available. Using an optical scanning boom configuration, ring or phase illumination are also easily implemented.

A x y z scanning mechanical stage on which the optical boom microscope is mounted is supported in free space by means of a base that is raised or lowered in the base z-axis to provide the ability to position and focus the scanning boom. The optics of the scanning boom can then be accurately positioned at a precise location over a sample for image acquisition by a CCD camera. By indexing the optical boom in x and y, a composite image of the overall sample area can be built up from individual images which have been obtained at high magnification.

While scanning and transferring the images at high speed to a computer, the z-axis drive on the microscope base moves the x y mechanical stage, CCD camera, the optical boom, the folding optic, the objective, and the laser coarse focus module as one assembly to maintain the sample in the proper coarse plane of focus. A fine focus drive mechanism can be attached to the microscope objective and configured to move in sub micron focus increments based on signals generated by a lens fine focus algorithm. For example, a piezo-based fine focus drive can be attached to the microscope e objective as described below.

As the optical boom scans over the sample and there are significant changes in Z morphology, the object piezo drive fine focus position can be measured and reported to the computer. When the piezo fine drive gets to within a predefined range, e.g., 50 microns, of the end of its range of travel, software based control signals can be sent to the piezo fine focus drive sending it back to the center or zero position of the piezo travel.

The difference between the zero position and the end of range position of the piezo drive can then be measured by the computer and a signal can be sent to the Z stage for piezo zero range correction, by adding an offset to the Z stage position, e.g., the determined difference between the zero position and end of range can be applied for range correction.

Figure 5:
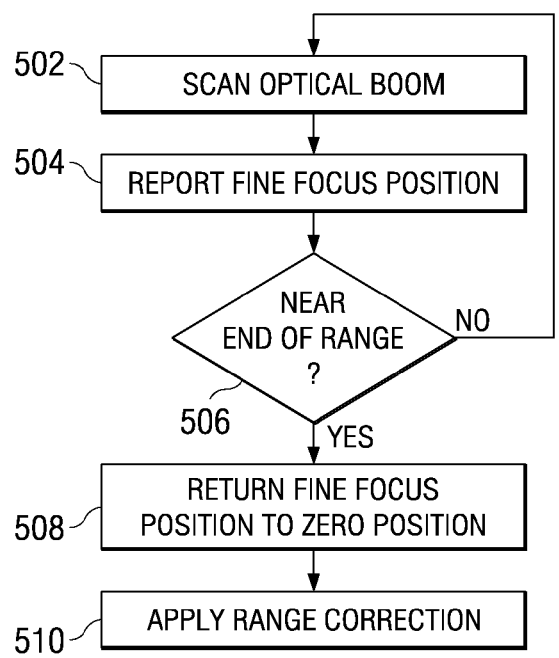
FIG. 5 is a flow chart illustrating an example method for maintaining fine focus position over variations in the Z topography for the scanning boom microscope of FIG. 1.

For example, FIG. 5 is a flow chart illustrating an example method for maintaining fine focus position over variations in the Z topography. First, in step 502, the optical boom is scanned across the sample. In step 504, the fine focus position is reported. In step 506, it is determined whether the fine focus drive is within a predetermined range of its end of travel range. If the fine focus drive is not within the predetermined range, then scanning can continue. If the fine focus drive is within the predetermined range, then the fine focus drive can be returned to its zero position in step 508. A range correction value can then be determined and applied in step 510 in order to adjust the coarse Z stage movement to account for the offset in Z range those results from the adjustment of the fine focus.

By providing this piezo range correction by means of a coarse Z stage movement, the fine focus positioning can be maintained over variations in Z topography and allow the scanning boom to maintain the fine focus position over large sample areas with large variations in focus positions required. Thus, a scanning boom microscope configured in accordance with the systems and methods described herein can scan and observe sample areas that conventional systems cannot.

Figure 1:
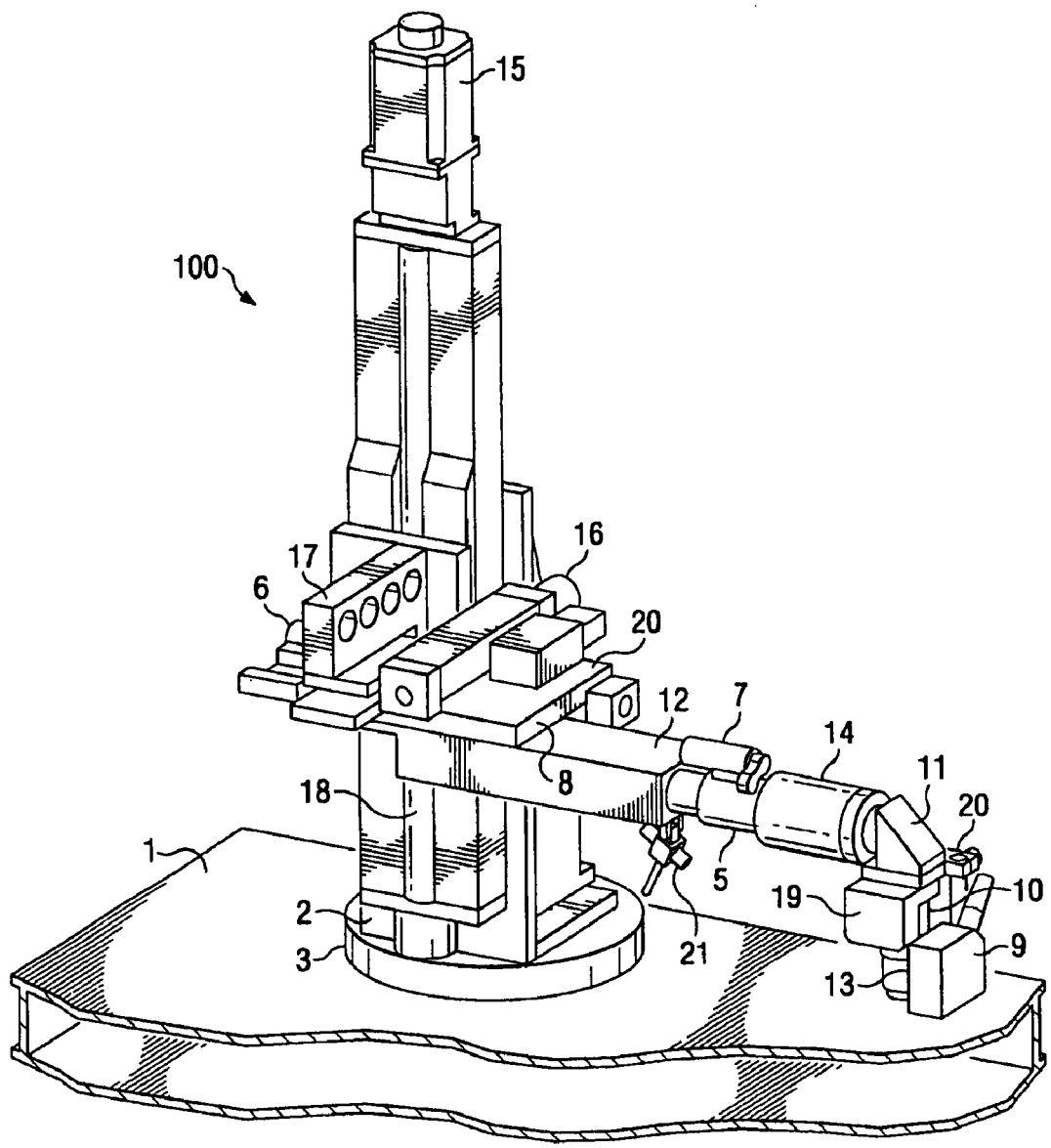
FIG. 1 is a detailed left side view a scanning boom microscope configured in accordance with one embodiment.

The optical and mechanical assembly of a scanning boom microscope 100 configured in accordance with one embodiment of the systems and methods described herein is illustrated in FIG. 1. Scanning boom microscope 100 comprises a scanning optical boom 5 attached to an adjustable elevation x stage 8 and y stage 20 supported by a vertical stand 2, which is attached to base 3. Base 3 can then be fixed to a base plate 1 that is configured to allow stand 2 and base 3 to be rotated into different circular orientations relative to the radial axis of stand 2.

Objective 10 can then be positioned as required over a sample. A wide variety of sample stages can be placed under, over or adjacent to objective 10 according to the application requirements.

A stage support 17 holds x stage 8 in a free, mid air position. Y stage 20 is mounted on x stage 8. A boom-to-stage clamp 12 can be configured to attach boom 5 to x stage 8. Accordingly, optical boom 5 can be cantilevered out over a sample. A Charge Couple Device (CCD) camera 4 (FIG. 2) can then be attached to optical boom 5.

A coaxial illuminator 14 can be located between a fold optic 11 and scanning optical boom 5 to provide coaxial reflected or transmitted illumination to the sample. Transmitted illumination is provided by placing a suitable illuminator under the sample illuminating towards the objective 10 through the sample.

A zoom module and motor 7 can be positioned between coaxial illuminator 14 and optical boom 5 to provide additional operator controlled magnification.

Objective optic 10 can be inserted into fold optic 11 to provide a 45 degree angular displacement of the received light from the sample. In certain embodiments, fold optic 11 can be rotated in 90 degree increments by a rotary detent barrel 14 to allow four directions of observation by objective 10. Objective 10 can then be rotated to UP, DOWN, LEFT or RIGHT viewing positions. A laser displacement sensor 9 can be adjusted manually by a sensor adjustment bracket 13 to the correct working distance and orientation to match the position and type of objective lens 10. This is not possible with conventional microscopes with classical form factors.

Computer generated signals can then be sent to x drive motor 16 and y drive motor 6 to move x y stage mechanics 8 and 20 respectively in the desired motion to produce a scan of the sample. A laser designation pointer 21 can be configured to provide adjustment of the sample to simplify initial x y positioning and assist z focusing.

A z-axis focus drive motor 15 (FIG. 2) is coupled to stage support 17 by z stage 18. When z focus drive motor 15 is driven by signals from the computer, the resultant vertical motion of z stage 18 and stage support 17 imparts vertical motion into stages 8 and 20, which moves the optical boom 5, the fold optic 11 and the objective lens 10 to provide the correct course focus over the sample.

A laser displacement sensor 9 coupled to the housing of fold optic 11 by bracket 13 can then be used to provide a coarse focus position signal to the computer. A fine focus signal is produced by image analysis algorithms from the image information received from the CCD camera 4. These signals can then be processed by the computer and a fine drive signal is sent to z focus drive motor 15 and fine focus piezo 19 to provide additional fine focus as necessary to maintain the sample in focus during static viewing or dynamic scanning.

Stand 2 and base 3 can be removed from base plate 1, rotated or moved to another position on base plate 1 to allow viewing objects in free space not located on base plate 1. This action and the position of rotary detent barrel 14 can allow scanning boom 5, zoom magnification 7 and the objective 10 to be used on the stage of an existing microscope apparatus that does not have scanning capability.

The information received from CCD 4 can also be stored and used to recreate the overall image of the sample. Several techniques exist for recompiling the images into on large image, and any of these techniques can be used in conjunction with the systems and methods described herein.

Figure 2:
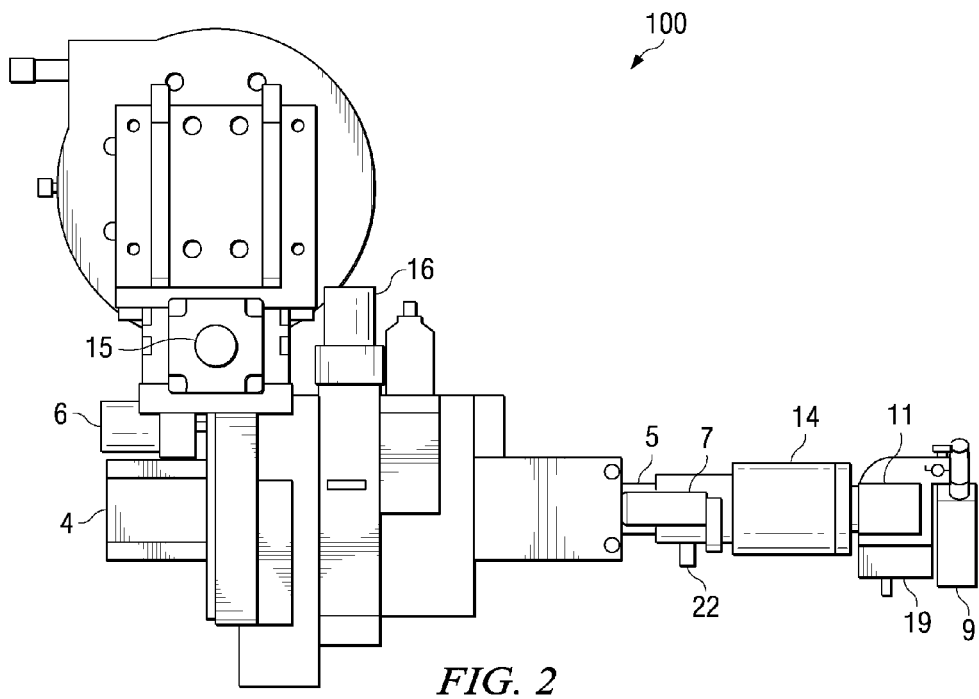
FIG. 2 is a plan view of the scanning boom microscope of FIG. 1.
Figure 3:
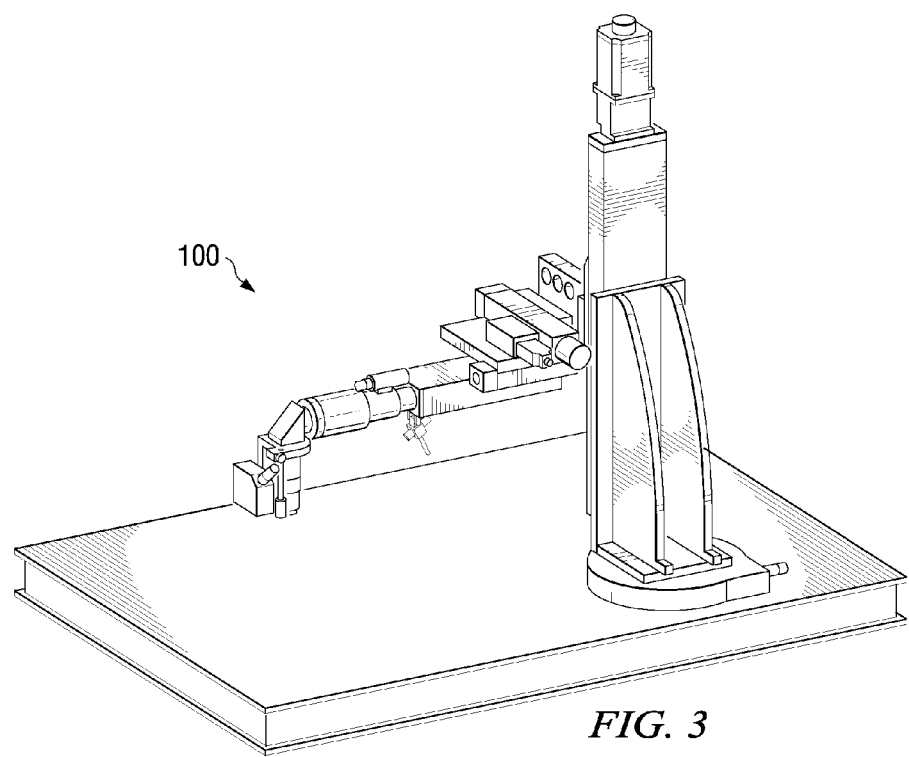
FIG. 3 is an oblique right side view of the scanning boom microscope of FIG. 1.
Figure 4:
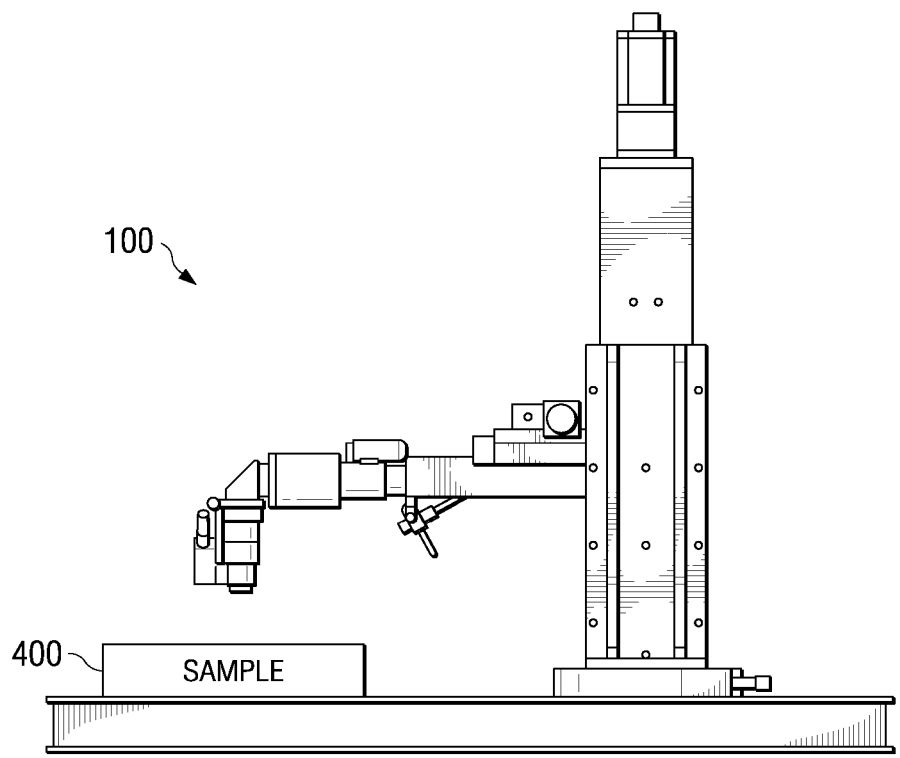
FIG. 4 is a right side view of the scanning boom microscope of FIG. 1 demonstrating the placement of a free standing sample to be scanned under the boom.

FIG. 2-4 provide alternative views of scanning microscope 100. FIG. 2 provides a view form the left of the scanning boom of microscope 100 and illustrates an example placement of CCD 4. It should be noted that while the embodiments described herein use a CDD, other embodiments can use other types of digital imaging devices as well as analog cameras or devices.

FIG. 3 provides a view from the right of scanning boom microscope 100. FIG. 4 illustrates placement of a sample stage 400 under objective 10. Again, a wide variety of sample stages 400 can be placed under, over or adjacent to objective 10 according to the application requirements While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed:

1. A microscope observing apparatus, comprising:
    a single free moving support;
    an x y z mechanical stage, the x y z mechanical stage configured to translate in an x, y, and z direction, and supported in space by the single free moving support;
    a scanning boom coupled with the x y z mechanical stage such that the scanning boom is supported in free space by the x y z mechanical stage and can be translated in the x, y, and z directions by the mechanical stage, the scanning boom comprising a radial optical axis.

2. The microscope observing apparatus according to claim 1, further comprising an optical viewing system coupled with the scanning boom, wherein the scanning boom, under control of the x y z mechanical stage, places the optical viewing system in proximity of a sample in any orientation about the radial optical axis of the scanning boom.

3. The microscope observing apparatus according to claim 2, wherein the scanning boom, under control of the x y z mechanical stage, places the optical viewing system in proximity of a sample at any position relative to the apparatus.

4. The microscope observing apparatus according to claim 2, wherein the optical viewing system comprises an objective and a folding optic, the folding optic configured to be rotated about the optical axis of the scanning boom allowing observation via the objective in a positive or negative z-direction and at side scanning positions.

5. The microscope observing apparatus of claim 4, wherein the folding optic is a 45 degree folding optic allowing observation via the objective through a 180 degree positive or through a zero negative position in the z-direction and at side scanning positions of 90 and 270 degrees relative to the normal position.

6. The microscope observing apparatus according to claim 4, wherein the folding optic and objective are configured to rotate around the scanning boom radial optical axis to observe objects in any angular orientation in relation to the scanning boom radial optical axis.

7. The microscope observing apparatus of claim 2, further comprising an image acquisition system configured to capture images obtained via the optical viewing system.

8. The microscope observing apparatus of claim 7, wherein information related to the captured images can be used for fine focus positioning of the optical viewing system via the scanning boom and x y z mechanical stage.

9. The microscope observing apparatus of claim 7, wherein the image acquisition system comprises a Charge Couple Device (CCD).

10. The microscope observing apparatus according to claim 1, further comprising a x y mechanical stage support and z drive mechanism on the x y mechanical stage support, and wherein the x y z mechanical stage is controlled by computer signals in the positive or negative z-axis by way of z drive mechanism.

11. The microscope observing apparatus of claim 1, further comprising a position sensor configured to measure a focus position, wherein the measured focus position is used for coarse focus positioning via the scanning boom and x y z mechanical stage.

12. The microscope observing apparatus according to claim 1, further comprising a base, the base configured to allow the scanning boom to be positioned 360 degree circular position relative to the base z-axis.

13. The image observation system of claim 1, wherein the microscope observing apparatus further comprises a position sensor configured to provide focus position information to the computer, and wherein the focus position information is used by the computer to control the x y z mechanical stage for coarse focus positioning.

14. An image observation system, comprising:
    microscope observing apparatus, comprising:
        a single free moving support;
        an x y z mechanical stage, the x y z mechanical stage configured to translate in an x ,y, and z direction, and supported in space by the single free moving support; and
        a scanning boom coupled with the x y z mechanical stage such that the scanning boom is supported in free space by the x y z mechanical stage and can be translated in the x, y, and z direction by the mechanical stage, the scanning boom comprising a radial optical axis; and
    a computer system configured to receive image information from the microscope observing apparatus and to control the x y z mechanical stage.

15. The image observation system according to claim 14, wherein the microscope observing apparatus further comprises an optical viewing system coupled with the scanning boom, wherein the scanning boom, under control of the x y z mechanical stage, places the optical viewing system in proximity of a sample in any orientation about the radial optical axis of the scanning boom.

16. The image observation system according to claim 15, wherein the scanning boom, under control of the x y z mechanical stage, places the optical viewing system in proximity of a sample at any position relative to the apparatus.

17. The image observation system according to claim 15, wherein the optical viewing system comprises an objective and a folding optic, the folding optic configured to be rotated about the optical axis of the scanning boom allowing observation via the objective in a positive or negative z-direction and at side scanning positions.

18. The image observation system of claim 17, wherein the folding optic is a 45 degree folding optic allowing observation via the objective through a 180 degree positive or through a zero negative position in the z-direction and at side scanning positions of 90 and 270 degrees relative to the normal position.

19. The image observation system according to claim 17, wherein the folding optic and objective are configured to rotate around the scanning boom radial optical axis to observe objects in any angular orientation in relation to the scanning boom radial optical axis.

20. The image observation system of claim 15, wherein the microscope observing apparatus further comprises an image acquisition system configured to capture images obtained via the optical viewing system.

21. The image observation system of claim 20, wherein the captured images are provided to the computer, and wherein the computer is configured to use information related to the captured images for fine focus positioning of the optical viewing system via the scanning boom and x y z mechanical stage.

22. The image observation system according to claim 21, wherein the microscope observing apparatus further comprises a fine focus drive, and wherein the computer is further configured to control the fine focus positioning by controlling the fine focus drive.

23. The image observation system according to claim 22, wherein the fine focus drive is a piezo drive.

24. The image observation system of claim 21, wherein the image acquisition system comprises a Charge Couple Device (CCD).

25. The image observation system of claim 21, wherein the image acquisition system comprises an analog camera.

26. The image observation system of claim 21, wherein the computer is further configured to index the captured images.

27. The image observation system of claim 26, wherein the computer is further configured to build up an overall image form the indexed, captured images.

28. The image observation system of claim 27, wherein the images are captured at high magnification.

29. The image observation system according to claim 14, wherein the microscope observing apparatus further comprises a x y mechanical stage support and z drive mechanism on the x y mechanical stage support, and wherein the x y z mechanical stage is controlled by computer signals in the positive or negative z-axis by way of z drive mechanism.

30. The image observation system according to claim 14, wherein the microscope observing apparatus further comprises a base, the base configured to allow the scanning boom to be positioned 360 degree circular position relative to the base z-axis.

31. A method for controlling the focus position of a scanning boom microscope comprising a single free moving support, an x y z mechanical stage, the x y z mechanical stage configured to translate in the x, y, and z direction, and supported in space by the single free moving support, and a scanning boom coupled with the x y z mechanical stage such that the scanning boom is supported in free space by the x y z mechanical stage, the scanning boom comprising a radial optical axis, the method comprising:
  scanning the scanning boom over a sample;
  receiving fine focus position information;
  determining if a fine focus drive is near the end of its fine focus range based on the received fine focus information;
  returning the fine focus drive to its zero position; and
  applying a range correction to a z position for the scanning boom microscope.

32. The method according to claim 31, wherein the range correction is based on the difference between the end of range and the zero position for the fine focus drive.

* * * * *